United States Patent
Cui et al.

(10) Patent No.: US 9,984,003 B2
(45) Date of Patent: May 29, 2018

(54) MAPPING PROCESSING METHOD FOR A CACHE ADDRESS IN A PROCESSOR TO PROVIDE A COLOR BIT IN A HUGE PAGE TECHNOLOGY

(71) Applicant: Huawei Technologies Co., Ltd., Shenzhen (CN)

(72) Inventors: Zehan Cui, Beijing (CN); Licheng Chen, Beijing (CN); Mingyu Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/257,506

(22) Filed: Sep. 6, 2016

(65) Prior Publication Data

US 2016/0371198 A1 Dec. 22, 2016

Related U.S. Application Data

(63) Continuation of application No. PCT/CN2015/073789, filed on Mar. 6, 2015.

(30) Foreign Application Priority Data

Mar. 6, 2014 (CN) .......................... 2014 1 0080762

(51) Int. Cl.
*G06F 12/00* (2006.01)
*G06F 12/1027* (2016.01)
(Continued)

(52) U.S. Cl.
CPC ...... *G06F 12/1027* (2013.01); *G06F 12/0802* (2013.01); *G06F 12/084* (2013.01);
(Continued)

(58) Field of Classification Search
CPC .............. G06F 12/0802; G06F 12/1009; G06F 12/0246; G06F 12/0253; G06F 12/08
(Continued)

(56) References Cited

U.S. PATENT DOCUMENTS

| 5,652,872 A | 7/1997 | Richter et al. |
| 5,860,151 A | 1/1999 | Austin et al. |

(Continued)

FOREIGN PATENT DOCUMENTS

| CN | 1486463 A | 3/2004 |
| CN | 1517882 A | 8/2004 |

(Continued)

OTHER PUBLICATIONS

Machine Translation and Abstract of Chinese Publication No. CN1517882, Aug. 4, 2004, 11 pages.

(Continued)

*Primary Examiner* — Mardochee Chery
(74) *Attorney, Agent, or Firm* — Conley Rose, P.C.

(57) ABSTRACT

A mapping processing method and apparatus for a cache address, where the method includes acquiring a physical address corresponding to an access address sent by a processing core, where the physical address includes a physical page number (PPN) and a page offset, mapping the physical address to a Cache address, where the Cache address includes a Cache set index 1, a Cache tag, a Cache set index 2, and a Cache block offset in sequence, where the Cache set index 1 with a high-order bit and the Cache set index 2 with a low-order bit together form a Cache set index, and the Cache set index 1 falls within a range of the PPN. Some bits of a PPN of a huge page PPN are mapped to a set index of a Cache so that the bits can be colored by an operating system.

11 Claims, 7 Drawing Sheets

(51) Int. Cl.
*G06F 12/0802* (2016.01)
*G06F 12/0811* (2016.01)
*G06F 12/084* (2016.01)
*G06F 12/0842* (2016.01)
*G06F 12/0895* (2016.01)
*G06F 12/0897* (2016.01)
*G06F 12/1009* (2016.01)

(52) U.S. Cl.
CPC ...... *G06F 12/0811* (2013.01); *G06F 12/0842* (2013.01); *G06F 12/0895* (2013.01); *G06F 12/0897* (2013.01); *G06F 12/1009* (2013.01); *G06F 2212/1016* (2013.01); *G06F 2212/152* (2013.01); *G06F 2212/6042* (2013.01); *G06F 2212/651* (2013.01); *G06F 2212/653* (2013.01); *G06F 2212/657* (2013.01)

(58) Field of Classification Search
USPC .......................................................... 711/3
See application file for complete search history.

(56) References Cited

U.S. PATENT DOCUMENTS

| | | | |
|---|---|---|---|
| 6,581,140 | B1 | 6/2003 | Sullivan et al. |
| 2003/0182532 | A1 | 9/2003 | Park et al. |
| 2004/0015644 | A1 | 1/2004 | Gammel et al. |
| 2004/0078544 | A1 | 4/2004 | Lee et al. |
| 2006/0026364 | A1 | 2/2006 | Haswell |
| 2010/0077149 | A1 | 3/2010 | Moyer |
| 2011/0231593 | A1* | 9/2011 | Yasufuku ............ G06F 12/1027 711/3 |
| 2012/0297139 | A1 | 11/2012 | Choi |

FOREIGN PATENT DOCUMENTS

| | | |
|---|---|---|
| CN | 101727405 A | 6/2010 |
| CN | 102184142 A | 9/2011 |
| CN | 103455443 A | 12/2013 |

OTHER PUBLICATIONS

Foreign Communication From a Counterpart Application, Chinese Application No. 201410080762.7, Chinese Office Action dated Jul. 18, 2017, 6 pages.

Awasthi, M., et al. "Dynamic Hardware-Assisted Software-Controlled Page Placement to Manage Capacity Allocation and Sharing within Large Caches", IEEE 19th International Symposium on High Performance Computer Architecture (HPCA)(2009), Feb. 14-18, 2009, pp. 250-261.

Pham, B., et al. "CoLT: Coalesced Large-Reach TLBs", 2012 45th Annual IEEE/ACM International Symposium on Microarchitecture (MICRO), Dec. 1-5, 2012, 12 pages.

Swanson, M., et al. "Increasing TLB Reach Using Superpages Backed by Shadow Memory", Proceedings. 25th Annual International Symposium on Computer Architecture, Jul. 1, 1998, 10 pages.

Fang, Z. et al. "Reevaluating Online Superpage Promotion with Hardware Support", Proceedings HPCA Seventh International Symposium on High-Performance Computer Architecture, Jan. 19-24, 2001, 9 pages.

Talluri, M., et al. "Surpassing the TLB Performance of Superpages with Less Operating System Support", Proceeding ASPLOS VI Proceedings of the sixth international conference on Architectural support for programming languages and operating systems, Oct. 5-7, 1994, 14 pages.

Foreign Communication From a Counterpart Application, Chinese Application No. 201410080762.7, Chinese Search Report dated Oct. 15, 2014, 5 pages.

Foreign Communication From a Counterpart Application, International Application No. PCT/CN2015/073789, English Translation of International Search Report dated May 27, 2015, 2 pages.

Foreign Communication From a Counterpart Application, International Application No. PCT/CN2015/073789, English Translation of Written Opinion dated May 27, 2015, 8 pages.

* cited by examiner

… (1)

MAPPING PROCESSING METHOD FOR A CACHE ADDRESS IN A PROCESSOR TO PROVIDE A COLOR BIT IN A HUGE PAGE TECHNOLOGY

CROSS-REFERENCE TO RELATED APPLICATIONS

This application is a continuation of international application number PCT/CN2015/073789 filed on Mar. 6, 2015, which claims priority to Chinese patent application number 201410080762.7 filed on Mar. 6, 2014, both of which are incorporated by reference.

TECHNICAL FIELD

Embodiments of the present disclosure relate to data storage technologies, and in particular, to a mapping processing method and apparatus for a cache address.

BACKGROUND

With expansion of a data set (that is, a set of data) and an increase in a quantity of processor cores, a translation lookaside buffer (TLB) and a cache are facing an increasingly severe challenge.

A problem of contention for a TLB is that in most computer architectures, a page table needs to be first queried during memory access performed each time, to translate a virtual address (VA) into a physical address (PA), and then the PA is used as an index to search a Cache in order to find data, in the Cache, needing to be obtained for the memory access. A page table generally has a quite large memory size and is stored in a memory in a tiered manner. The TLB serves as a buffer of a page table to temporarily store a few frequently used page table entries stored at a location quite near a central processing unit (CPU) core. In this way, a process of translation between a VA and a PA can be greatly accelerated if a mapping relationship to be queried between the VA and the PA is stored in the TLB, that is, a TLB access hit occurs. However, the memory still needs to be searched in a tiered manner for a page table to obtain a corresponding page table entry if a TLB access miss often occurs, which leads to a long access delay. With increasing expansion of a data set in a big data era, such contention for a TLB only becomes increasingly fierce, which causes more TLB access misses, and severely affects performance.

A problem of contention for a Cache is that in most multi-core architectures, a last level Cache (LLC) is shared by multiple cores, which causes LLC contention between cores and causes cache replacement between processes, thereby reducing cache utilization. Particularly, some programs have relatively poor locality, but frequent accesses occur and there is a quite large working set, which results in that a relatively high capacity of the LLC is occupied in order to seriously affect performance of other processes. As a quantity of cores increases, a problem of contention for an LLC is increasingly serious.

In the prior art, a huge page technology and a page-coloring based Cache partition technology are generally used to optimize performance. A quantity of page table entries required by a process is a size of a working set (a working set is a memory required by a process during a specific period) or a memory size of a page. The working set of the process is increasingly expanded according to an application requirement. In this case, a quantity of page tables required by the process can be remarkably reduced by increasing a memory size of a page. For example, a memory size of an ordinary page is 4 kilobytes (KB), and a quantity of page tables required by a process can be reduced by 512 times using a huge page whose memory size is 2 megabytes (MB), which greatly relieves TLB contention pressure and reduces TLB Misses in order to improve performance.

A method for reducing contention for an LLC includes allocating an LLC to different cores or processes statically or dynamically, to isolate the cores or processes from each other without causing contention. This technology is referred to as cache partition. Page-coloring is a method for implementing cache partition by means of software, which has advantages of being easy to use and requiring no hardware modification. FIG. 1 is a schematic diagram of a principle of page-coloring based Cache partition. As shown in FIG. 1, FIG. 1 shows the principle of page-coloring based Cache partition. From a perspective of an operating system, a PA may be divided into two parts, a physical page number (PPN) and a page offset. From a perspective of a Cache, a PA may be divided into three parts, a cache tag, a cache set index, and a cache block offset. The operating system can control a PPN, but cannot control a page offset. Assuming that a quantity of bits of a page offset is N, a memory size of a page is 2N. An intersection between a PPN and a cache set index is referred to as a color bit. The operating system can map an address to a specified cache set by controlling a PPN (that is, controlling a color bit). In this way, different color bits are allocated to different processes, that is, addresses can be mapped to different cache sets in order to implement mutual isolation.

FIG. 2 is a schematic diagram of a contradiction between a huge page technology and page-coloring based Cache partition technology. As shown in FIG. 2, there are a higher quantity of bits of a page offset area in a huge page (because a page has a larger memory size, more bits are required to indicate a page offset), while there are a lower quantity of bits of a PPN area, and the PPN area does not intersect with a cache set index any more. There is no color bit so that an operating system cannot control a cache set index any more in a manner of controlling a PPN. Therefore, in an existing hardware architecture, a contradiction between a huge page technology and a page-coloring based Cache partition technology exists, which results in that these two technologies cannot be used at the same time.

SUMMARY

With respect to a disadvantage in the prior art that a huge page technology and a page-coloring based Cache partition technology cannot be used at the same time, embodiments of the present disclosure provide a mapping processing method and apparatus for a cache address.

One aspect of the embodiments of the present disclosure provides a mapping processing method for a cache address, including acquiring a PA corresponding to an access address sent by a processing core, where the PA includes a PPN and a page offset, and mapping the PA to a Cache address, where the Cache address includes a first cache set index (Cache Set Index 1), a cache tag, a second cache set index (Cache Set Index 2), and a cache block offset in sequence, where the Cache Set Index 1 with a high-order bit and the Cache Set Index 2 with a low-order bit together form a cache set index, and the Cache Set Index 1 falls within a range of the PPN.

Another aspect of the embodiments of the present disclosure further provides another mapping processing method for a cache address, including acquiring a pseudo PA corresponding to an access address sent by a processing core, where the pseudo PA includes a pseudo PPN and a pseudo page offset, where the pseudo PPN includes a first address part, the pseudo page offset includes a second address part, and a quantity of bits of the first address part is the same as a quantity of bits of the second address part, exchanging bits of the first address part and the second address part to implement mapping of the pseudo PA to a real PA, where the real PA includes a real PPN and a real page offset, the PPN includes the second address part, and the page offset includes the first address part, and mapping the real PA to a Cache address, where the Cache address includes a cache tag, a cache set index, and a cache block offset, where the first address part falls within a range of the Cache set index.

Another aspect of the embodiments of the present disclosure provides a mapping processing apparatus for a cache address, including a first acquiring module configured to acquire a PA corresponding to an access address sent by a processing core, where the PA includes a PPN and a page offset, and a first mapping module configured to map the PA to a Cache address, where the Cache address includes a Cache Set Index 1, a cache tag, a Cache Set Index 2, and a cache block offset in sequence, where the Cache Set Index 1 with a high-order bit and the Cache Set Index 2 with a low-order bit together form a cache set index, and the Cache Set Index 1 falls within a range of the PPN.

Another aspect of the embodiments of the present disclosure further provides another mapping processing apparatus for a cache address, including a second acquiring module configured to acquire a pseudo PA corresponding to an access address sent by a processing core, where the pseudo PA includes a pseudo PPN and a pseudo page offset, where the pseudo PPN includes a first address part, the pseudo page offset includes a second address part, and a quantity of bits of the first address part is the same as a quantity of bits of the second address part, a second mapping module configured to exchange bits of the first address part and the second address part to implement mapping of the pseudo PA to a real PA, where the real PA includes a real PPN and a real page offset, the PPN includes the second address part, and the page offset includes the first address part, and a third mapping module configured to map the real PA to a Cache address, where the Cache address includes a cache tag, a cache set index, and a cache block offset, where the first address part falls within a range of the Cache set index.

According to the mapping processing method and apparatus for a cache address that are provided in the embodiments of the present disclosure, some bits of a PPN of a huge page are mapped to a Cache set index such that the bits can be colored by an operating system. Therefore, a requirement for using a huge page technology and a page-coloring based Cache partition technology at the same time is met, and the performance is improved using a huge page and page-coloring based Cache partition.

BRIEF DESCRIPTION OF DRAWINGS

The following briefly introduces accompanying drawings required for describing embodiments of the present disclosure.

DESCRIPTION OF EMBODIMENTS

The following describes various exemplary embodiments, features, and aspects of the present disclosure in detail with reference to accompanying drawings. Identical reference signs in the accompanying drawings indicate components that have same or similar functions. Although various aspects of the embodiments are shown in the accompanying drawings, unless otherwise specified, the accompanying drawings do not need to be drawn to scale.

The word "exemplary" for exclusive use herein means "used as an example or embodiment or for a descriptive purpose". Any embodiment described herein for an "exemplary" purpose does not need to be explained as being superior to or better than other embodiments.

In addition, to better describe the present disclosure, many specific details are provided in the following specific implementation manners. Persons skilled in the art should understand that the present disclosure can still be implemented without these specific details. In some other embodiments, methods, means, components, and circuits well known by persons skilled in the art are not described in detail so that a main purpose of the present disclosure is highlighted.

In the prior art, because a PPN of a huge page does not overlap with a Cache set index, page-coloring based Cache partition cannot be implemented by controlling the PPN of the huge page. A root cause of this contradiction is that a PA operated by an operating system is the same as a PA for accessing a cache. Therefore, a requirement for performing page-coloring cannot be met inevitably when a huge page technology is used. Embodiments of the present disclosure provide a solution which meets a requirement for using a huge page technology and a page-coloring based Cache partition technology at the same time.

Figure 1:
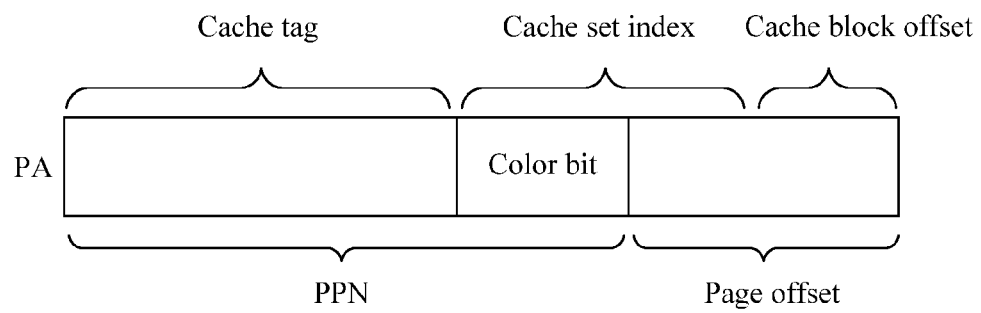
FIG. 1 is a schematic diagram of a principle of page-coloring based Cache partition.
Figure 2:
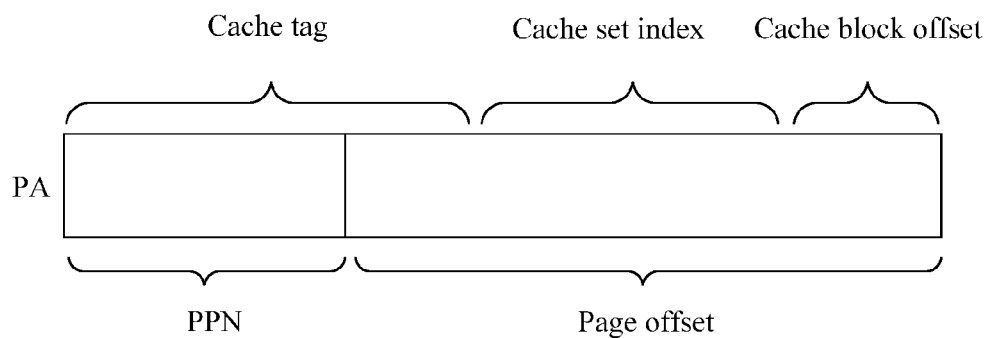
FIG. 2 is a schematic diagram of a contradiction between a huge page and page-coloring based Cache partition.
Figure 3:
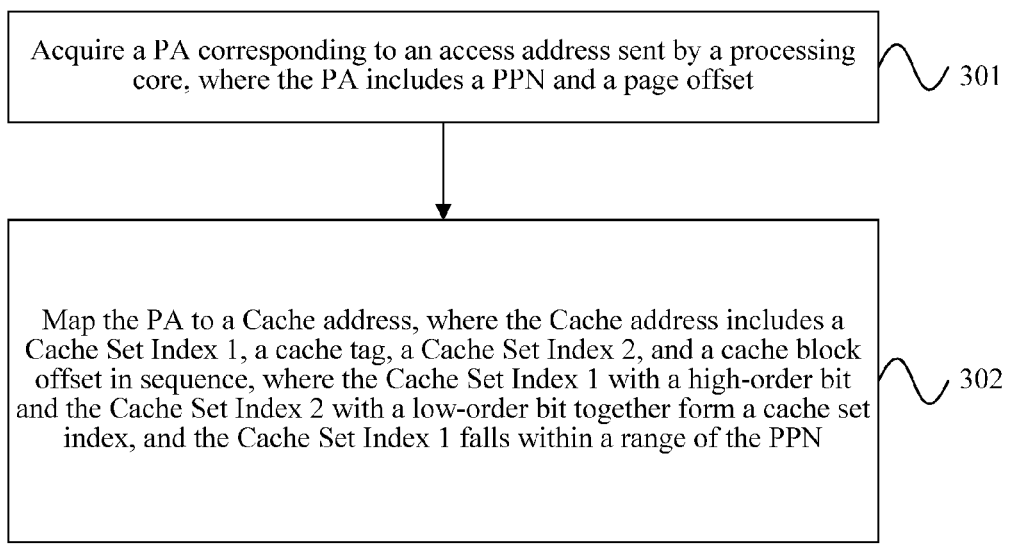
FIG. 3 is a flowchart of an embodiment of a mapping processing method for a cache address according to the present disclosure.

FIG. 3 is a flowchart of an embodiment of a mapping processing method for a cache address according to the present disclosure. As shown in FIG. 3, the method includes the following steps.

Step 301: Acquire a PA corresponding to an access address sent by a processing core, where the PA includes a PPN and a page offset.

Step 302: Map the PA to a Cache address, where the Cache address includes a Cache Set Index 1, a cache tag, a Cache Set Index 2, and a cache block offset in sequence, where the Cache Set Index 1 with a high-order bit and the Cache Set Index 2 with a low-order bit together form a cache set index, and the Cache Set Index 1 falls within a range of the PPN.

Figure 4:
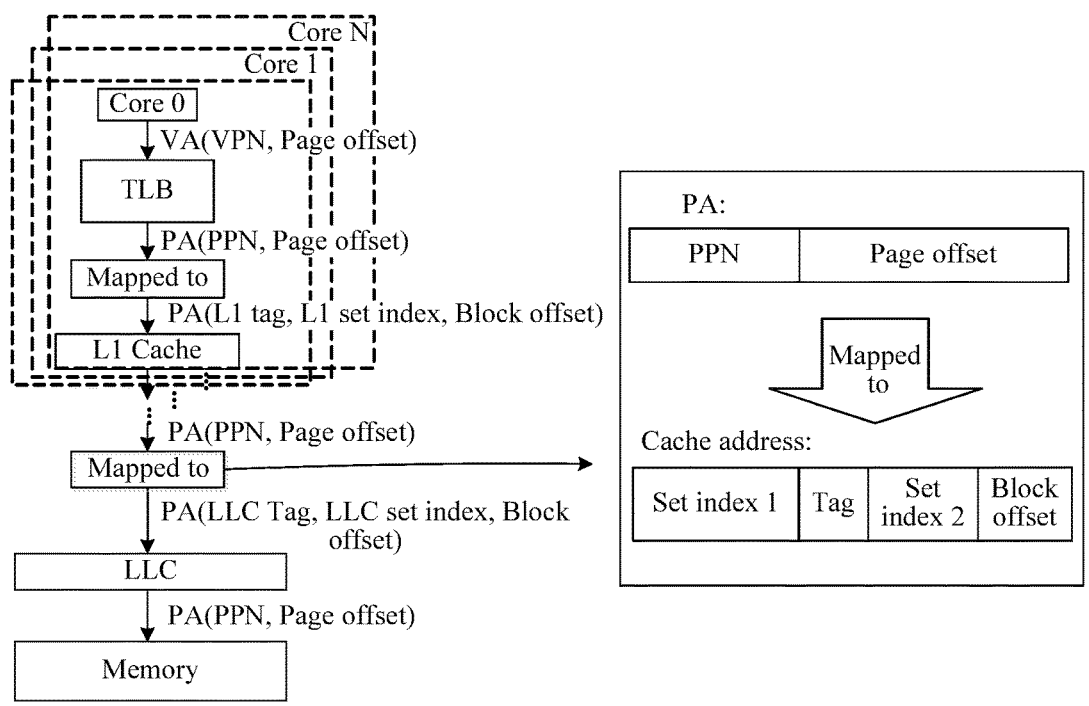
FIG. 4 is a schematic diagram of an application scenario according to a method embodiment of the present disclosure.

The following describes this method embodiment in detail with reference to an application scenario of specific hardware. FIG. 4 is a schematic diagram of an application scenario according to this method embodiment of the present disclosure. In the application scenario of this method embodiment of the present disclosure, a multi-core processor is used, where the multi-core processor includes multiple processor cores, a TLB, a multi-level private Cache, a shared LLC, a memory, and the like, as shown in FIG. 4.

A memory access address sent by a processing core (for example, a Core 0) is a VA including a virtual physical page number (VPN) and a virtual page offset. A PA is obtained by querying the TLB and includes a PPN and a page offset. The PA is mapped to obtain an address for accessing a cache at each level, and some bits of the PA serve as a set index to find all Cache lines in a corresponding set, and then some bits of the PA serve as a tag to be compared with a tag of these Cache lines in a parallel manner, to determine whether a Cache hit occurs. The PA is transferred to a further-next level Cache until being transferred to the memory if the Cache hit does not occur.

According to this method embodiment, a manner for accessing a cache using a PA is improved, that is, a mapping relationship from the PA to a Cache address is changed, and a set index is changed to be formed by two parts. One part, like an existing manner, is formed by some address bits near a block offset, and in this way, consecutive Cache lines can carry different Cache sets, which avoids a Cache conflict caused when successive accesses are performed. The other part is formed by some address bits, with high-order bits, of the PA, where the address bits are a part of a PPN of a huge page.

As shown in FIG. 4, the Cache address mapped from the PA includes a Cache Set Index 1, a cache tag, a Cache Set Index 2, and a cache block offset in sequence, where the Cache Set Index 1 with a high-order bit and the Cache Set Index 2 with a low-order bit together form a cache set index, and the Cache Set Index 1 falls within a range of the PPN. The Cache Set Index 1 serves as a color bit, and an operating system can control a mapping relationship from a VPN to the PPN and control the color bit to map a page to a specified group of sets so that page-coloring based cache partition is implemented while a huge page technology is used.

In the foregoing method embodiment, a quantity of bits of the Cache Set Index 1 and a quantity of bits of the Cache Set Index 2 may be the same or may be different.

Figure 5:
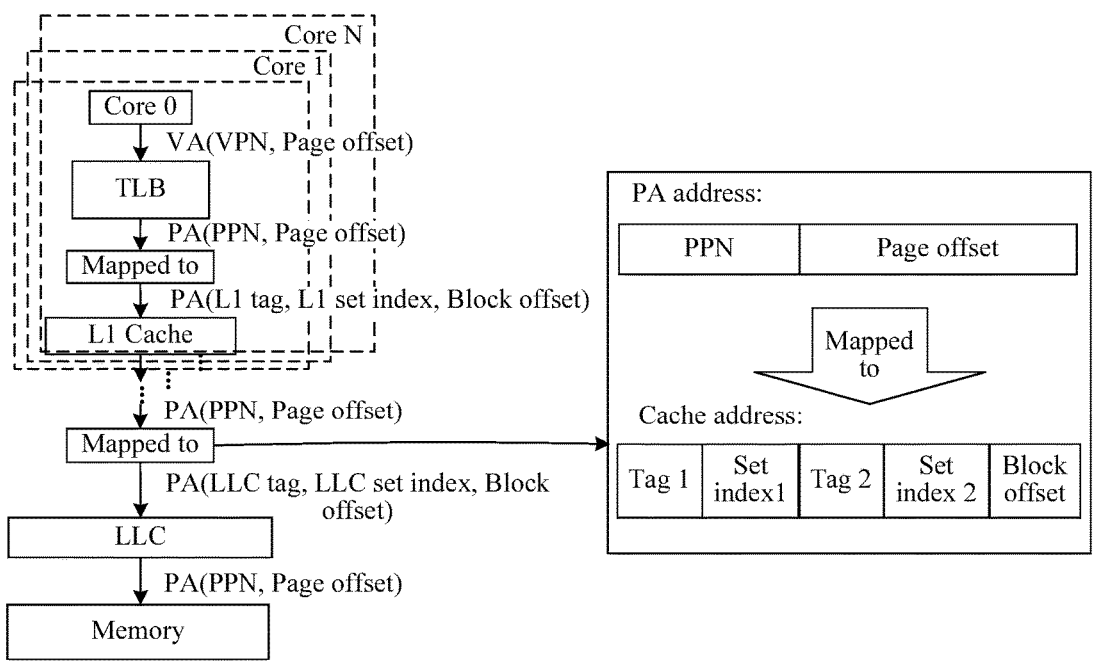
FIG. 5 is a schematic diagram of another application scenario according to a method embodiment of the present disclosure.

FIG. 5 is a schematic diagram of another application scenario according to this method embodiment of the present disclosure. A difference from FIG. 4 is only that the PA is mapped to a different Cache address. In another implementation manner, a Cache tag in the Cache address obtained by means of mapping may also be divided into two parts. Furthermore, as shown in FIG. 5, the Cache tag includes a first cache tag (Cache Tag 1) with a high-order bit and a second cache tag (Cache Tag 2) with a low-order bit, and the Cache Set Index 1 is located between the Cache Tag 1 and the Cache Tag 2. Further, a quantity of bits of the Cache Tag 1 and a quantity of bits of the Cache Tag 2 may be the same or may be different.

In the foregoing method embodiment, mapping the PA to the Cache address may be further performed on a Cache at any level or all Caches, and may be completed by means of control performed by a programmable register.

Figure 6:
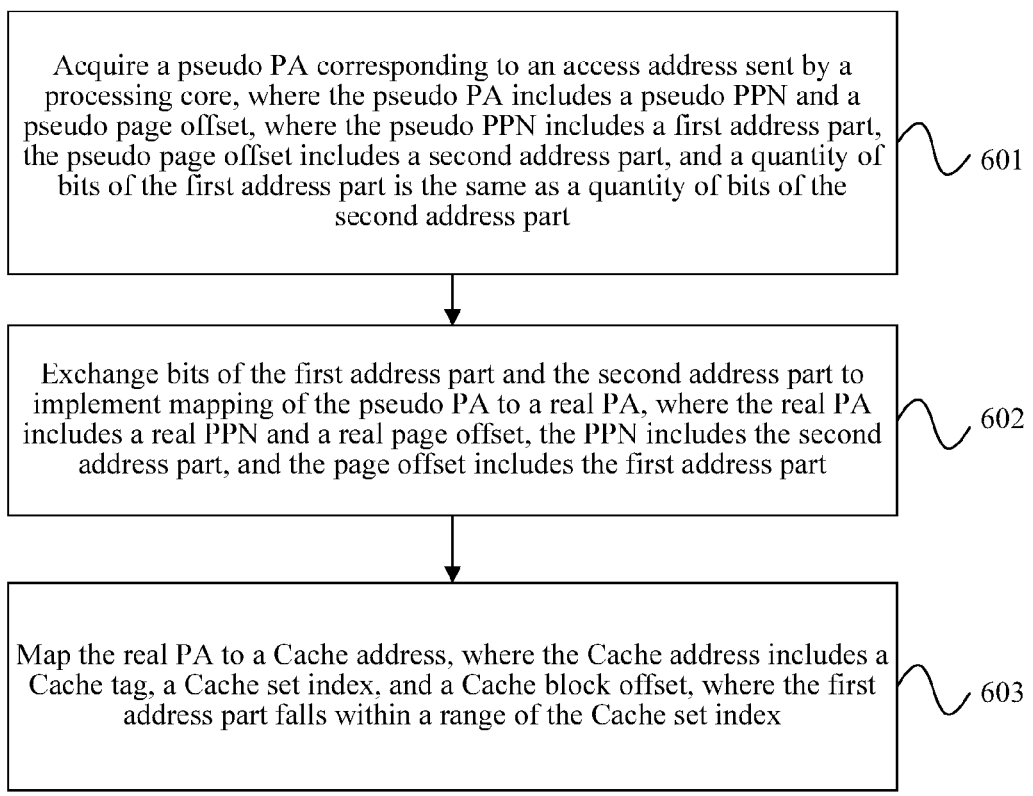
FIG. 6 is a flowchart of another embodiment of a mapping processing method for a cache address according to the present disclosure.

FIG. 6 is a flowchart of another embodiment of a mapping processing method for a cache address according to the present disclosure. As shown in FIG. 6, the method includes the following steps.

Step 601: Acquire a pseudo PA corresponding to an access address sent by a processing core, where the pseudo PA includes a pseudo PPN and a pseudo page offset, where the pseudo PPN includes a first address part, the pseudo page offset includes a second address part, and a quantity of bits of the first address part is the same as a quantity of bits of the second address part.

Step 602: Exchange bits of the first address part and the second address part to implement mapping of the pseudo PA to a real PA, where the real PA includes a real PPN and a real page offset, the PPN includes the second address part, and the page offset includes the first address part.

Step 603: Map the real PA to a Cache address, where the Cache address includes a cache tag, a Cache set index, and a Cache block offset, where the first address part falls within a range of the Cache set index.

Figure 7:
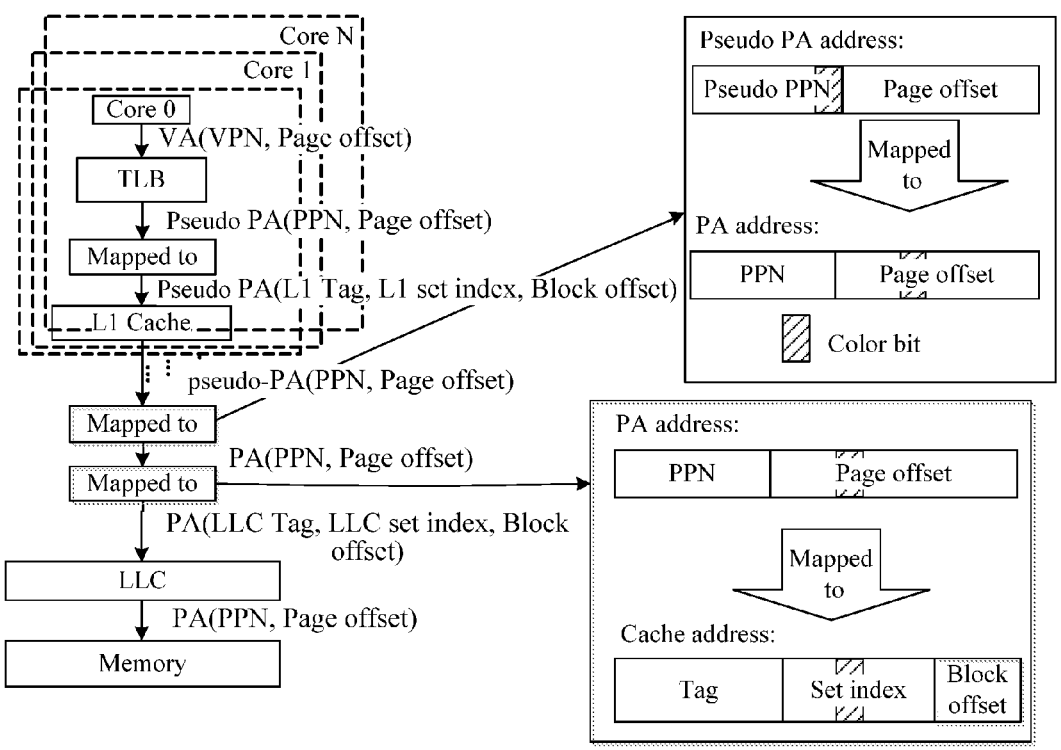
FIG. 7 is a schematic diagram of still another application scenario according to a method embodiment of the present disclosure.

The following describes this method embodiment in detail with reference to an application scenario of specific hardware. FIG. 7 is a schematic diagram of still another application scenario according to this method embodiment of the present disclosure. In the application scenario in this method embodiment of the present disclosure, a multi-core processor is used, where the multi-core processor includes multiple cores, a TLB, a multi-level private Cache, a shared LLC, a memory, and the like, as shown in FIG. 7.

A memory access address sent by a processing core (for example, a Core 0) is a VA including a VPN and a virtual page offset. A pseudo PA is obtained by querying the TLB and includes a pseudo PPN and a pseudo page offset. The pseudo PPN includes a first address part with a predetermined quantity of bits, the pseudo page offset includes a second address part, and the quantity of bits of the first address part is the same as a quantity of bits of the second address part.

In this embodiment of the present disclosure, a layer of pseudo PA space is added before a Cache, and an operating system manages the pseudo PA space to perform huge page management and page-coloring management of the pseudo PA space. Before the Cache is accessed, the pseudo PA is first mapped to a real PA, and the PA is mapped to obtain an address for accessing a cache at each level, where some bits of the PA serve as a set index to find all Cache lines in a corresponding set, and then some bits of the PA serve as a tag to be compared with a tag in these Cache lines in a parallel manner, to determine whether a Cache hit occurs. The PA is transferred to a further-next level Cache until being transferred to the memory if the Cache hit does not occur.

Figure 8:
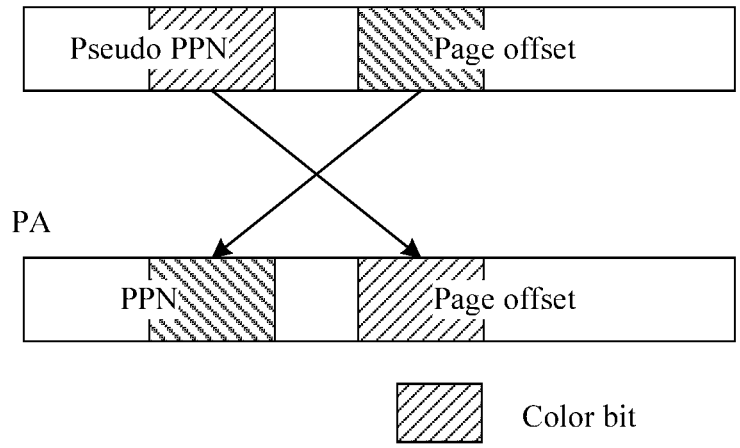
FIG. 8 is a schematic diagram of a method for mapping a pseudo PA to a real PA according to a method embodiment of the present disclosure.

FIG. 8 is a schematic diagram of a method for mapping a pseudo PA to a real PA according to a method embodiment of the present disclosure. As shown in FIG. 8, some bits are selected from a page number, namely, pseudo PPN, of the pseudo PA, to serve as color bits, that is, a first address part, and then a same quantity of bits (in a Cache set index), that is, a second address part, are selected from a page offset. The bits of the first address part and the bits of the second address part are exchanged. The color bits are in the page offset in the obtained real PA and finally mapped to a Cache set index according to a mapping relationship from the PA to a Cache address.

According to this method embodiment of the present disclosure, before a Cache is accessed, a mapping component first translates the pseudo PA into the real PA to access the cache and a memory. A color bit (for example, a color bit, with a low-order bit, of a PPN) controlled by an operating system is mapped to a location of the Cache set index according to a mapping relationship.

In FIG. 7, pseudo PA space is managed by the operating system, and a TLB is filled with a mapping relationship from a VA to a pseudo PA. Furthermore, an L1 Cache in FIG. 7 is still accessed using the pseudo PA, and the pseudo PA is translated into the real PA only when a memory access reaches a LLC. Certainly, a location at which the pseudo PA is translated into the real PA is not limited to a location before the LLC shown in FIG. 7, and may also be before an L1 Cache or before an L2 Cache. A mapping relationship from the pseudo PA to the real PA in FIG. 7 achieves the following effect. A color bit (a part of a pseudo PPN) in the pseudo PA space of a huge page in the pseudo PA space is mapped to a low-order bit of the real PA after being mapped, and finally mapped to a set index of a Cache address.

In the foregoing method embodiment, mapping the pseudo PA to the real PA may be performed on a Cache at any level or all Caches, and may be completed by means of control performed by a programmable register.

According to the mapping processing method for a cache address in this embodiment of the present disclosure, some bits of a PPN of a huge page are mapped to a set index of a Cache so that the bits can be colored by an operating system. Therefore, a requirement for using a huge page technology and a page-coloring based Cache partition technology at the same time is met, and the performance is improved using a huge page and page-coloring based Cache partition. In addition, all changes involve only a change in an address mapping relationship without adding an additional circuit. A change in an address mapping can ensure a one-to-one mapping without management of the operating system.

Figure 9:
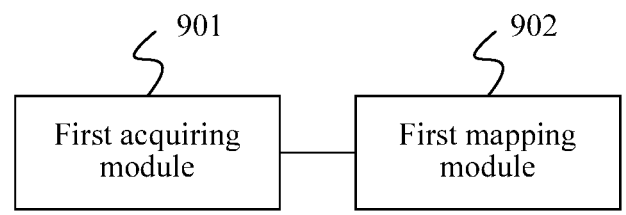
FIG. 9 is a schematic diagram of an embodiment of a mapping processing apparatus for a cache address according to the present disclosure.

FIG. 9 is a schematic diagram of an embodiment of a mapping processing apparatus for a cache address according to the present disclosure. As shown in FIG. 9, the apparatus includes a first acquiring module 901 and a first mapping module 902, where the first acquiring module 901 is configured to acquire a PA corresponding to an access address sent by a processing core, where the PA includes a PPN and a page offset, and the first mapping module 902 is configured to map the PA to a Cache address, where the Cache address includes a Cache Set Index 1, a cache tag, a Cache Set Index 2, and a cache block offset in sequence, the Cache Set Index 1 with a high-order bit and the Cache Set Index 2 with a low-order bit together form a cache set index, and the Cache Set Index 1 falls within a range of the PPN.

In the apparatus embodiment, a quantity of bits of the Cache Set Index 1 and a quantity of bits of the Cache Set Index 2 may be the same or different. The first mapping module 902 is further configured to divide the Cache tag into a Cache Tag 1 with a high-order bit and a Cache Tag 2 with a low-order bit, and allow the Cache Set Index 1 to be located between the Cache Tag 1 and the Cache Tag 2, where a quantity of bits of the Cache Tag 1 and a quantity of bits of the Cache Tag 2 may be the same or different.

The apparatus embodiment of the present disclosure can further perform the foregoing methods shown in FIG. 3, FIG. 4, and FIG. 5, and specific functions thereof are not described herein again.

Figure 10:
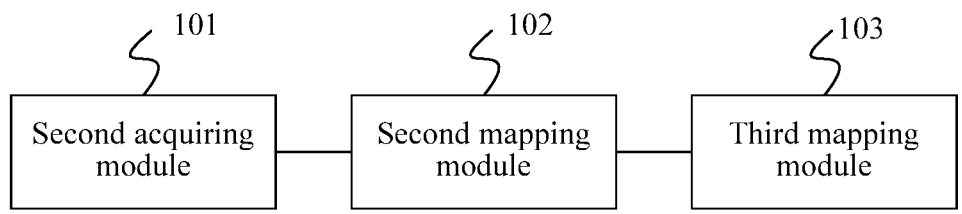
FIG. 10 is a schematic diagram of another embodiment of a mapping processing apparatus for a cache address according to the present disclosure.

FIG. 10 is a schematic diagram of another embodiment of a mapping processing apparatus for a Cache address according to the present disclosure. As shown in FIG. 10, the apparatus includes a second acquiring module 101, a second mapping module 102, and a third mapping module 103, where the second acquiring module 101 is configured to acquire a pseudo PA corresponding to an access address sent by a processing core, and the pseudo PA includes a pseudo PPN and a pseudo page offset, where the pseudo PPN includes a first address part, the pseudo page offset includes a second address part, and a quantity of bits of the first address part is the same as a quantity of bits of the second address part. The second mapping module 102 is configured to exchange bits of the first address part and the second address part to implement mapping of the pseudo PA to a real PA, where the real PA includes a real PPN and a real page offset, and the PPN includes the second address part, the page offset includes the first address part, and the third mapping module 103 is configured to map the real PA to a Cache address, where the Cache address includes a cache tag, a Cache set index, and a cache block offset, and the first address part falls within a range of the Cache set index.

The apparatus embodiment of the present disclosure can further perform the foregoing methods shown in FIG. 6, FIG. 7, and FIG. 8, and specific functions thereof are not described herein again.

According to the mapping processing apparatus for a cache address in this embodiment of the present disclosure, some bits of a PPN of a huge page are mapped to a set index of a Cache so that the bits can be colored by an operating system. Therefore, a requirement for using a huge page technology and a page-coloring based Cache partition technology at the same time is met, and the performance is improved using a huge page and page-coloring based Cache partition. In addition, all changes only involve a change in an address mapping relationship without adding an additional circuit. A change in an address mapping can ensure a one-to-one mapping without management of the operating system.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The integrated unit may be stored in a computer-readable storage medium when the foregoing integrated unit is implemented in a form of a software functional unit. The software functional unit is stored in a storage medium and includes several instructions for instructing a computer device (which may be a personal computer, a server, or a network device)

or a processor to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In an actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not depart from the scope of the technical solutions of the embodiments of the present disclosure.

What is claimed is:

1. A mapping processing method for a cache address in a processor to provide a color bit in a huge page technology, wherein the processor comprises a processing core, a translation lookaside buffer (TLB) coupled to the processing core, and a cache memory coupled to the TLB, and wherein the method comprises:
   receiving, by the TLB, an access request from the processing core, wherein the access request comprises a virtual address;
   acquiring, by the TLB, a pseudo physical address corresponding to the virtual address, wherein the pseudo physical address is obtained by translating the virtual address by querying a page table entry in the TLB, wherein the pseudo physical address comprises a pseudo physical page number and a pseudo page offset, wherein the pseudo physical page number comprises a first address part that is used as the color bit, wherein the pseudo page offset comprises a second address part, and wherein a quantity of bits used to indicate the first address part is the same as a quantity of bits used to indicate the second address part;
   exchanging, by the cache memory, bit values of the first address part and the second address part that are in the pseudo physical address to obtain a real physical address, wherein the real physical address comprises a real physical page number and a real page offset, wherein a quantity of bits used to indicate the real physical page number is the same as a quantity of bits used to indicate the pseudo physical page number, wherein a quantity of bits used to indicate a page offset is the same as a quantity of bits used to indicate the pseudo page offset, wherein the second address part falls within a range of bits of the real physical page number, and wherein the first address part falls within a range of bits of the page offset; and
   translating, by the cache memory, the real physical address into the cache address, wherein the cache address comprises a cache tag, a cache set index, and a cache block offset, and wherein a bit used to indicate the first address part falls within a range of bits of the cache set index.

2. A mapping processing method for a cache address in a processor to provide a color bit in a huge page technology, wherein the processor comprises a processing core and a translation lookaside buffer (TLB) coupled to the processing core, and wherein the method comprises:
   receiving, by the TLB, an access request from the processing core, wherein the access request comprises a virtual address;
   acquiring, by the TLB, a physical address corresponding to the virtual address, wherein the physical address comprises a physical page number and a page offset; and
   mapping, by the TLB, the physical address to the cache address, wherein the cache address comprises a first cache set index that is used as the color bit, a cache tag, a second cache set index, and a cache block offset, wherein the first cache set index with a high-order bit and the second cache set index with a low-order bit together form a cache set index, and wherein the first cache set index falls within a range of bits of the physical page number.

3. The method according to claim 2, wherein a quantity of bits used to indicate the first cache set index is the same as a quantity of bits used to indicate the second cache set index.

4. The method according to claim 2, further comprising:
   dividing the cache tag into a first cache tag with the high-order bit and a second cache tag with the low-order bit; and
   allowing the first cache set index to be located between the first cache tag and the second cache tag.

5. The method according to claim 4, wherein a quantity of bits used to indicate the first cache tag is the same as a quantity of bits used to indicate the second cache tag.

6. The method according to claim 2, wherein mapping the physical address to the cache address is controlled by a programmable register.

7. A processor, providing a color bit in a huge page technology, comprising:
   a processing core configured to send an access request, wherein the access request comprises a virtual address;
   a translation lookaside buffer (TLB) coupled to the processing core and configured to:
      receive the access request from the processing core; and
      acquire a pseudo physical address corresponding to the virtual address, wherein the pseudo physical address comprises a pseudo physical page number and a pseudo page offset, wherein the pseudo physical page number comprises a first address part that is used as the color bit, wherein the pseudo page offset comprises a second address part, and wherein a quantity of bits used to indicate the first address part is the same as a quantity of bits used to indicate the second address part; and
   a cache memory coupled to the processing core and configured to:
      exchange bit values of the first address part and the second address part that are in the pseudo physical address to obtain a real physical address, wherein the real physical address comprises a real physical page number and a real page offset, wherein a quantity of bits used to indicate the real physical page number is the same as a quantity of bits used to indicate the pseudo physical page number, wherein a quantity of bits used to indicate a page offset is the same as a quantity of bits used to indicate the pseudo page offset, wherein the second address part falls within a range of bits of the real physical page number, and wherein the first address part falls within a range of bits of the page offset; and translate the real physical address into a cache address, wherein the cache address comprises a cache tag, a cache set index, and wherein a cache block offset, wherein a bit used to indicate the first address part falls within a range of bits of the cache set index.

8. A processor, providing a color bit in a huge page technology, comprising:

a processing core configured to send an access request, wherein the access request comprises a virtual address; and a translation lookaside buffer (TLB) coupled to the processing core and configured to:

acquire to a physical address corresponding to the virtual address, wherein the physical address comprises a physical page number and a page offset; and map the physical address to a cache address, wherein the cache address comprises a first cache set index that is used as the color bit, a cache tag, a second cache set index, and a cache block offset, wherein the first cache set index with a high-order bit and the second cache set index with a low-order bit together form a cache set index, and wherein the first cache set index falls within a range of bits of the physical page number.

9. The processor according to claim 8, wherein a quantity of bits used to indicate the first cache set index is the same as a quantity of bits used to indicate the second cache set index.

10. The processor according to claim 8, wherein the TLB is further configured to:

divide the cache tag into a first cache tag with the high-order bit and a second cache tag with the low-order bit; and set the first cache set index between the first cache tag and the second cache tag.

11. The processor according to claim 10, wherein a quantity of bits used to indicate the first cache tag is the same as a quantity of bits used to indicate the second cache tag.

* * * * *

UNITED STATES PATENT AND TRADEMARK OFFICE
CERTIFICATE OF CORRECTION

| | |
|---|---|
| PATENT NO. | : 9,984,003 B2 |
| APPLICATION NO. | : 15/257506 |
| DATED | : May 29, 2018 |
| INVENTOR(S) | : Zehan Cui, Licheng Chen and Mingyu Chen |

It is certified that error appears in the above-identified patent and that said Letters Patent is hereby corrected as shown below:

On the Title Page

Under Notice (*) section should read:
(*) Subject to any disclaimer, the term of this patent is extended or adjusted under 35 U.S.C. 154(b) by 0 days.

Signed and Sealed this
Seventeenth Day of July, 2018

Andrei Iancu
*Director of the United States Patent and Trademark Office*